(12) United States Patent
Gwin

(10) Patent No.: US 7,427,076 B2
(45) Date of Patent: Sep. 23, 2008

(54) BASE TOOL CADDY FOR JANITORIAL CLEANING SUPPLIES

(76) Inventor: David Christopher Gwin, 2931-D Eskridge Rd., Fairfax, VA (US) 22031

( * ) Notice: Subject to any disclaimer, the term of this patent is extended or adjusted under 35 U.S.C. 154(b) by 248 days.

(21) Appl. No.: 11/378,435

(22) Filed: Mar. 20, 2006

(65) Prior Publication Data
US 2006/0214384 A1    Sep. 28, 2006

Related U.S. Application Data

(60) Provisional application No. 60/594,253, filed on Mar. 22, 2005.

(51) Int. Cl.
*B62B 1/00* (2006.01)
(52) U.S. Cl. .............. 280/79.2; 280/79.5; 280/33.998
(58) Field of Classification Search .......... 280/33.991, 280/33.998, 79.11, 79.2, 79.5
See application file for complete search history.

(56) References Cited

U.S. PATENT DOCUMENTS

| | | | | |
|---|---|---|---|---|
| 5,390,944 A * | 2/1995 | Sherwin | ................... | 280/47.35 |
| 5,758,888 A * | 6/1998 | Burgan et al. | ............. | 280/47.34 |
| 5,897,018 A * | 4/1999 | Pruitt | ........................ | 220/603 |
| 6,135,467 A * | 10/2000 | Tagariello | ................... | 280/79.5 |
| 6,209,891 B1 * | 4/2001 | Herrmann | ................... | 280/32.6 |
| RE37,350 E * | 9/2001 | Stephan | ..................... | 280/79.5 |
| 6,315,310 B1 * | 11/2001 | Hurt | ......................... | 280/79.5 |
| 6,851,686 B2 * | 2/2005 | Figueroa | .................... | 280/79.5 |
| 7,168,714 B2 * | 1/2007 | Gibbs | ....................... | 280/47.34 |
| 7,240,910 B2 * | 7/2007 | Stuemke | .................... | 280/79.5 |
| 2003/0052465 A1 * | 3/2003 | Ahmed et al. | .............. | 280/79.5 |

* cited by examiner

*Primary Examiner*—Christopher Ellis
*Assistant Examiner*—Brian Swenson
(74) *Attorney, Agent, or Firm*—Jonathan E. Grant; Grant Patent Services

(57) ABSTRACT

A base tool caddy for janitorial cleaning supplies is disclosed. The tool caddy has an inner circular element which can be in the shape of a cylinder. This inner circular element fits around the base of a standard commercial trash barrel. The inner circular element has an inwardly disposed lip that is designed to fit between the bottom of a commercial trash barrel and the top of the trash barrel's standard commercial wheeled dolly thereby securing the tool caddy to the trash barrel, dolly combination. The inner circular element has one or more outwardly disposed compartments designed to hold janitorial tools and supplies. These outwardly disposed compartments may be configured to serve as a bumper, thereby protecting walls and other surfaces from being marked by the trash barrel. The outwardly disposed compartments may incorporate a stabilizing edge to prevent the trash barrel from rolling when laid on its side.

8 Claims, 4 Drawing Sheets

BASE TOOL CADDY FOR JANITORIAL CLEANING SUPPLIES

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

BACKGROUND OF THE INVENTION

Janitorial service providers commonly collect trash, dust, sweep, and perform light washing and kitchen clean-up. These providers employ specialized tools and products in providing these services. A commonly used tool is a commercial trash barrel. Such a trash barrel is available in a standard 44-gallon size and has the approximate shape of a tapered cylinder. Typical dimensions of the trash barrel are 20-inch diameter at its base, 24-inch diameter at its top and a height of 32 inches. The trash barrel accepts a flexible plastic trash barrel liner that keeps the trash barrel clean and facilitates removal of trash. The trash barrel has a screw fitting protruding from its base. The screw fitting protrudes approximately ¾-inch and has a diameter of approximately 11 inches. The screw fitting mates with a corresponding fitting on a wheeled dolly. The trash barrel mounted on the wheeled dolly can be moved and maneuvered much more easily than a trash barrel not mounted on a wheeled dolly.

In addition to the trash barrel/wheeled dolly combination, the service provider carries an assortment of tools and cleaning supplies useful in performing assigned tasks. Such tools may include brooms, brushes and cleaning cloths, and such supplies may include spray cleaners, soaps and polishes. Oftentimes a service provider carries tools and supplies in a makeshift fashion by hanging them from the trash barrel or placing them inside the trash barrel. A makeshift approach can leave the provider's tools and supplies disorganized, unsecured, difficult to access and hard to keep track of. In addition, the tools and supplies may interfere with removal and replacement of the flexible plastic trash barrel liner. It is desirable to carry such tools and supplies organized and secure in a tool caddy attached to the trash barrel in a manner that does not interfere with removal and replacement of the flexible plastic trash barrel liner.

A tool caddy that protrudes outward from a trash barrel reduces the maneuverability of the trash barrel. A compromise exists between designing a tool caddy large enough to provide adequate storage space, but not so large as to substantially reduce the maneuverability of the trash barrel.

When full of trash the trash barrel is quite heavy. The ergonomically preferred method of emptying a trash barrel is to lay the barrel on its side and remove the trash by extracting the flexible plastic trash barrel liner that contains the trash. One deficiency of the trash barrel is that its circular shape makes it prone to uncontrolled rolling when laid on its side. The rolling instability of the barrel makes removal of the trash more difficult. A device that stabilizes a trash barrel lain on its side would facilitate removal of the flexible plastic trash barrel liner filled with trash.

One deficiency of a trash barrel mounted on a dolly is that it has high center of gravity when filled with trash. This high center of gravity makes the trash barrel susceptible to accidental tipping. A tool caddy attached at or near the top of a trash barrel further raises the center of gravity and aggravates the tipping problem.

The top diameter of a trash barrel is typically greater than the bottom diameter. Additionally, a narrow lip protrudes outward from the top edge and continues around the entire circumference. The protruding upper lip is generally the outermost point of a trash barrel. As a service provider maneuvers a trash barrel through a cleaning area, the upper lip often bumps or rubs against walls and other objects in the cleaning area. A common deficiency of a trash barrel is its tendency to mar surfaces, particularly painted walls, when the top lip bumps or rubs against them.

BRIEF SUMMARY OF THE INVENTION

Among the several objects and advantages of the present invention include:

The provision of a new tool caddy which includes an inner circular element supporting one or more outwardly disposed compartments for carrying janitorial tools and supplies, with means to attach the inner circular element at the base of a standard commercial trash barrel, thereby lowering the center of gravity of the trash barrel and making it less susceptible to tipping;

The provision of the aforesaid tool caddy which includes an inner lip that allows attachment of the tool caddy to the trash barrel by disposing the inner lip between the base of the trash barrel and its wheeled dolly;

The provision of the aforesaid tool caddy which includes an inner circular element in the shape of a cylinder designed to accept the base of a commercial trash barrel thereby increasing the rigidity of the tool caddy so that it is less susceptible to bending and has increased load carrying capacity;

The provision of the aforementioned tool caddy having an outer edge which extends beyond the circumference of the upper edge of the aforesaid trash barrel thereby providing a bumper that protects walls and other surfaces from being scraped or marred by the upper circumferential edge of the trash barrel;

The provision of the aforesaid tool caddy having an outer stabilizing edge configured to stabilize the trash barrel when the trash barrel is tilted on its side thereby making removal of the flexible plastic trash barrel liner easier;

The provision of the aforesaid tool caddy which includes rounded edges to lessen the chance of marring or scraping of objects struck by the tool caddy;

The provision of the aforesaid tool caddy which includes construction of molded rigid plastic;

The provision of the aforesaid tool caddy which includes narrowed opposing outer edges to enhance maneuverability of the tool caddy when installed upon a trash barrel; and The provision of the aforesaid tool caddy which includes one or more outwardly disposed compartments specially shaped to accept specific janitorial tools and supplies.

The utility of the tool caddy subject of the present invention is adapted to the dimensions of standard commercial trash barrels. The tool caddy is held above the floor by a commercial wheeled dolly designed for and fitted to a standard commercial trash barrel.

DETAILED DESCRIPTION OF THE PREFERRED EMBODIMENTS

The following detailed description of the invention illustrates the invention by way of example and not by way of limitation. The description will enable one skilled in the art to make and use the invention, and describes several embodiments, adaptations, variations and alternatives of the invention, including what is believed to be the preferred embodiments of the invention. With reference to the figures, like elements have been given like numerical designations to facilitate the reader's understanding of the invention.

Figure 1:
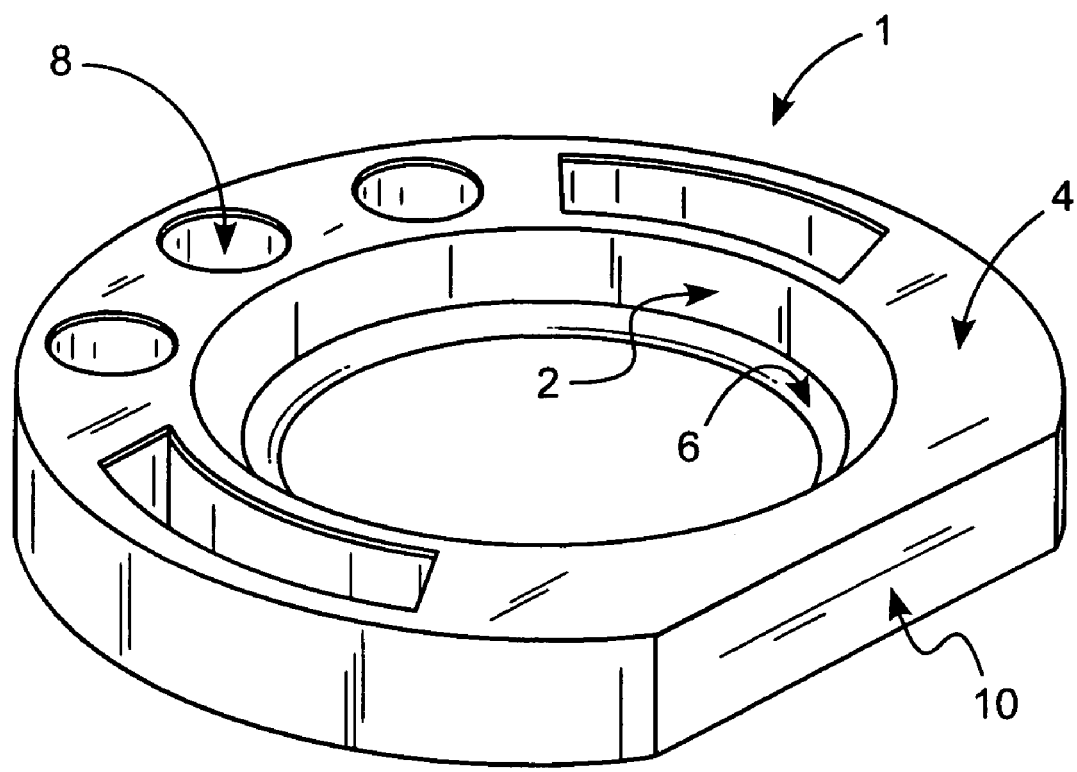
FIG. 1, is a top perspective view of the present invention.
Figure 2:
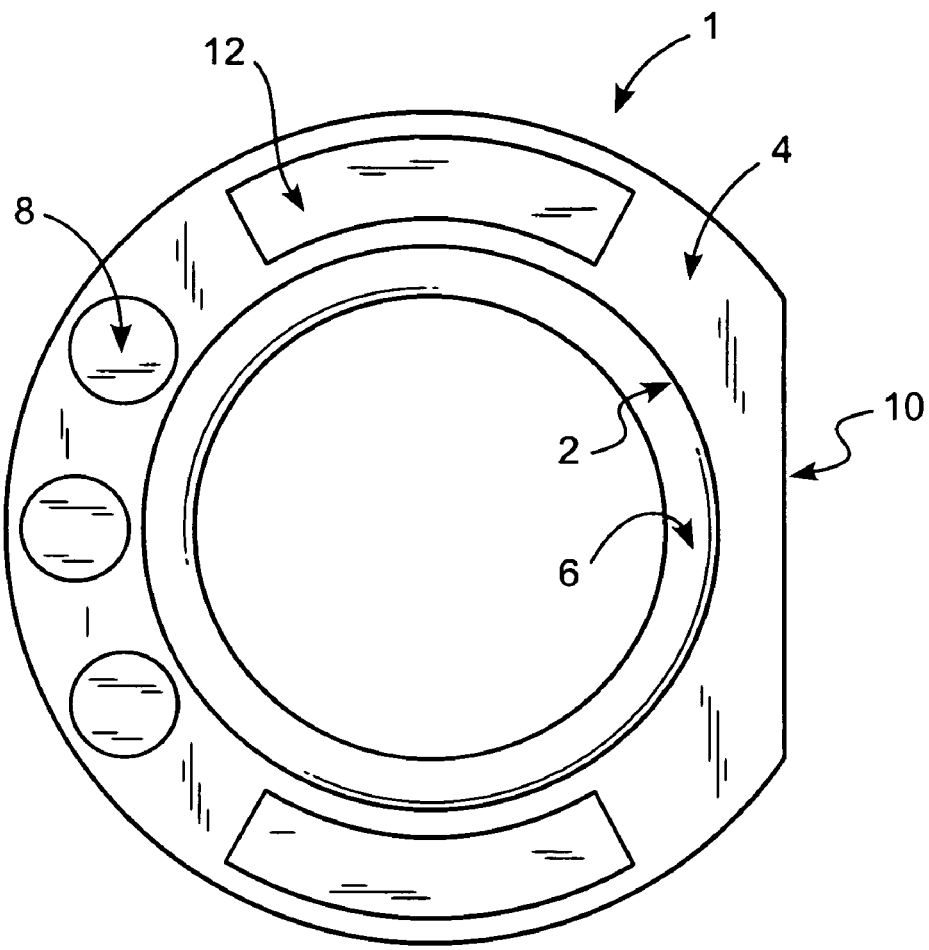
FIG. 2 is a top plan view of the present invention.
Figure 3:
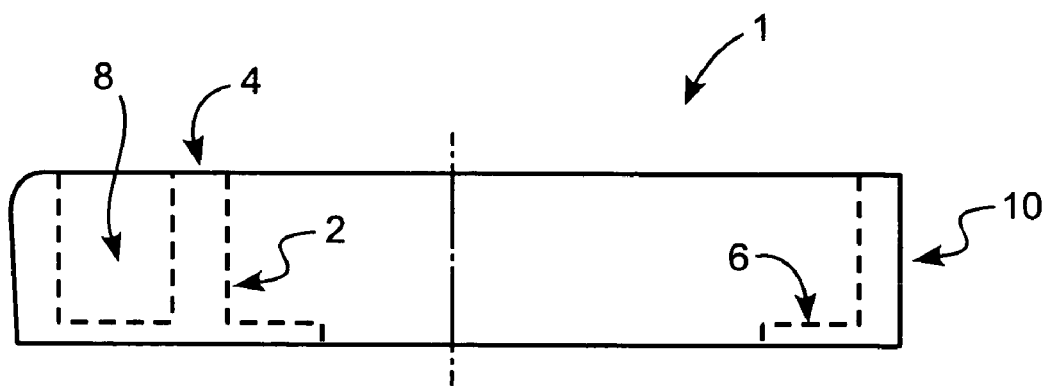
FIG. 3 is a side elevation view of the present invention.
Figure 4:
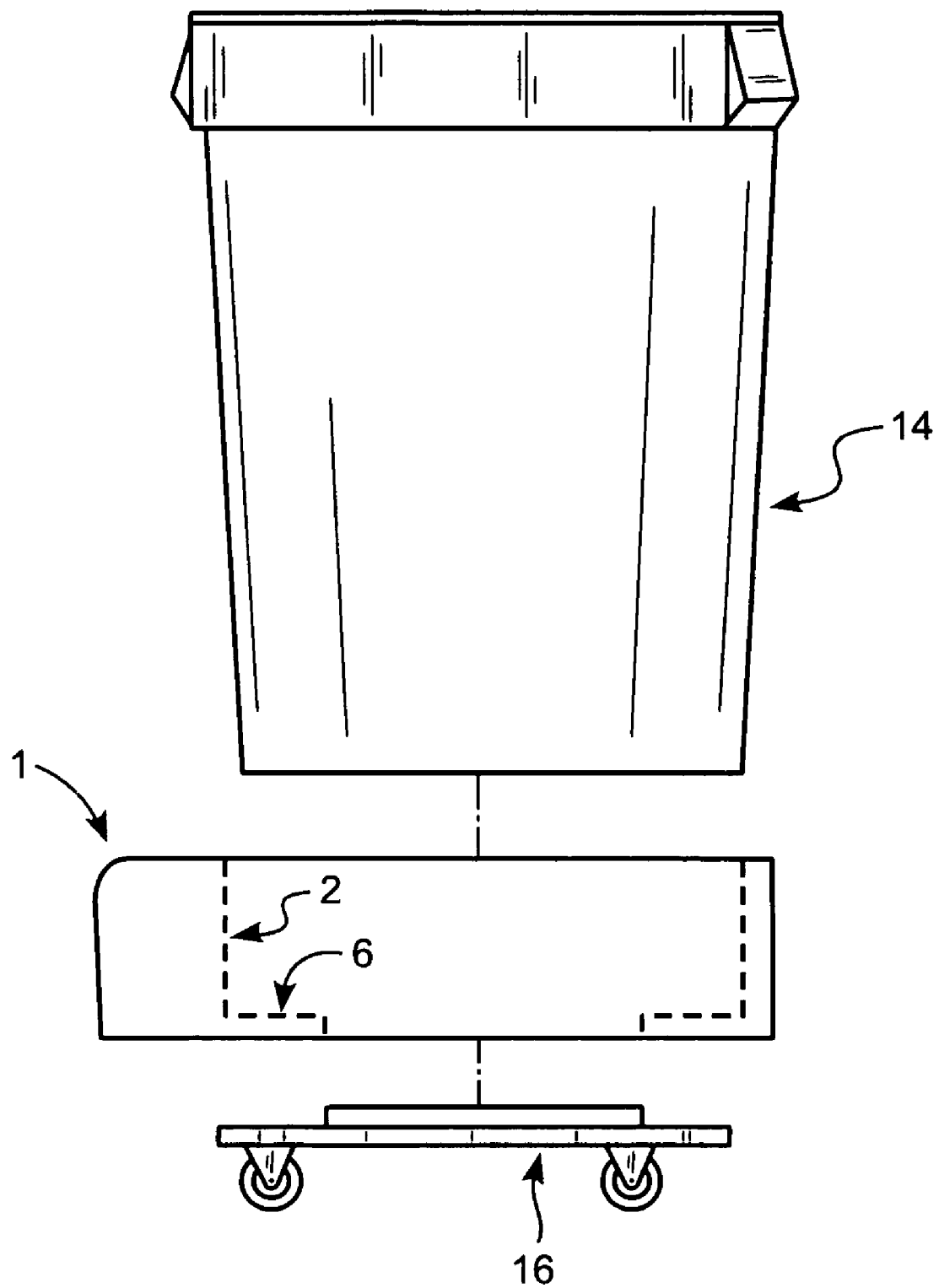
FIG. 4 is an exploded side elevation of the present invention situated between a trash barrel and a wheeled dolly.
Figure 5:
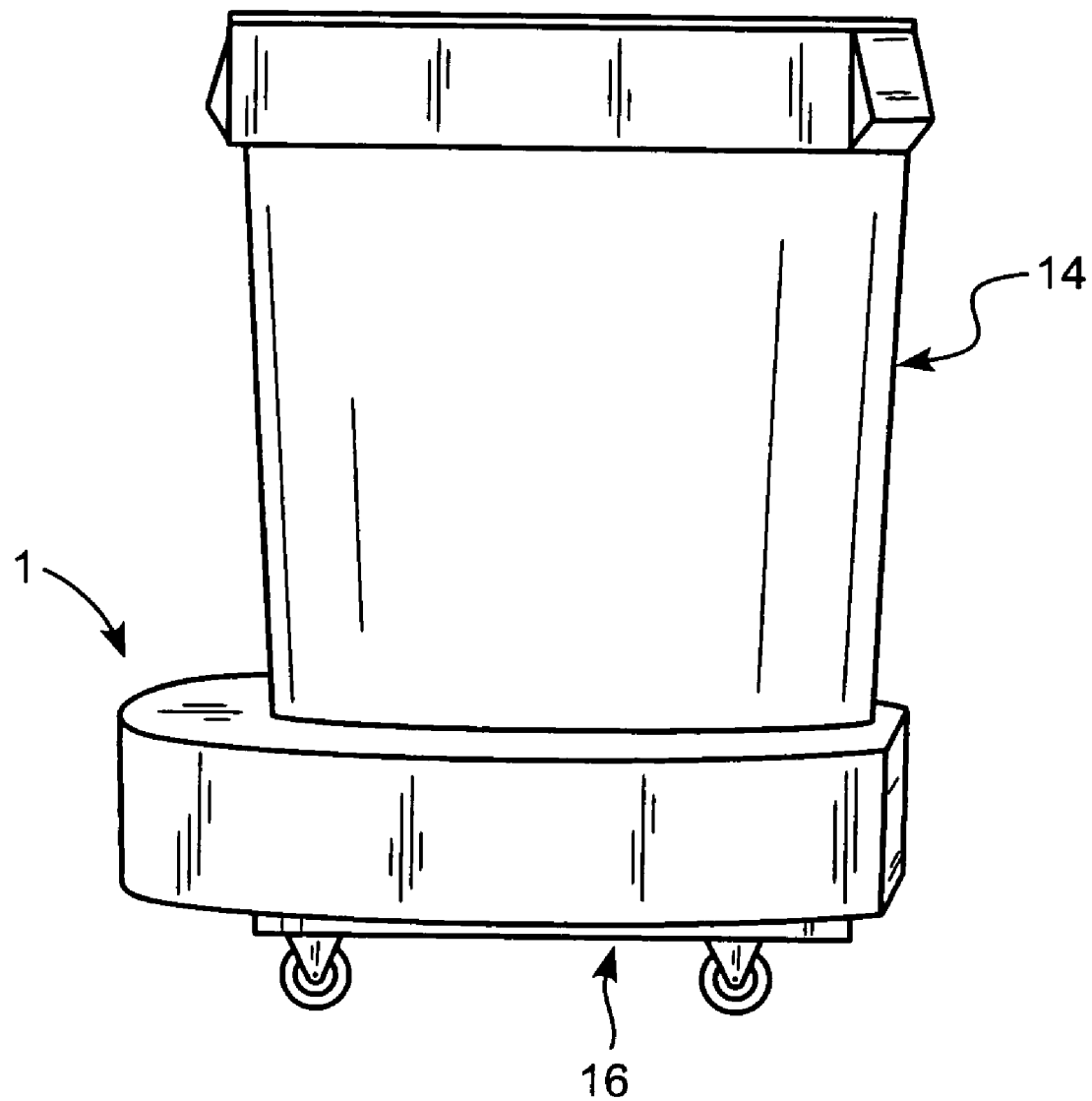
FIG. 5 is a side elevation of the present invention assembled with the trash barrel and wheeled dolly.

A preferred embodiment of the tool caddy 1 of the present invention is shown in FIGS. 1-5. As best seen in FIG. 4 and FIG. 5 the tool caddy is configured so that a standard commercial trash barrel 14 can reside in the annulus created by the tool caddy's inner circular element 2 as best seen in FIGS. 1-3. A standard commercial trash barrel 14 designed to accept a standard commercial wheeled dolly 16 is shown in FIG. 4 and FIG. 5. A pressure-fit or screw-fit element on the bottom of the trash barrel mates with a corresponding element on the wheeled dolly. The tool caddy 1 is secured in place by an inner lip 6 shown in FIGS. 1-3 that is inwardly disposed from the inner circular element 2 and as shown in FIG. 4 and FIG. 5 is compressed between the trash barrel 14 and the wheeled dolly 16 when the trash barrel and wheeled dolly are assembled together as designed. Increasing the height of the tool caddy's inner circular element 2 increases its rigidity thereby making it less prone to bending or buckling.

As shown in FIGS. 1-3 the tool caddy 1 according to the invention has one or more compartments 8 and 12 outwardly disposed from the tool caddy's inner circular element 2. The compartments 8 and 12 may be shaped to accept specific supplies such as spray bottles, cans of cleaning supplies, cloths, sponges, dustpans and brooms. By its location at the base of the trash barrel 14, the tool caddy 1 will lower the center of gravity of the trash barrel, tool caddy, wheeled dolly combination shown in FIG. 5. By relocating tools and supplies typically carried near the top of the trash barrel 14 into the tool caddy 1 at the bottom of the trash barrel, the center of gravity of the trash barrel, tool caddy, wheeled dolly combination will be further lowered. This lower center of gravity will reduce the tendency of the trash barrel 14 to tip over.

As shown in FIG. 1 and FIG. 2 of this embodiment, the tool caddy 1 has an outer stabilizing edge 10. The outer stabilizing edge 10 is designed to stabilize the trash barrel 14 when it is laid on its side. The trash barrel 14 is laid on its side in a manner such that the outer stabilizing edge 10 prevents the trash barrel from rolling. This simplifies removal of the flexible plastic trash barrel liner from the trash barrel 14. Because the tool caddy 1 is located at the base of the trash barrel 14, it does not interfere with the removal or installation of the flexible plastic trash barrel liner. While the outer stabilizing edge 10 is shown as flat in FIG. 1 and FIG. 2 it may be of any alternative configuration that provides a similar stabilizing effect.

As shown in FIG. 4 and FIG. 5 of this embodiment, the outer edge of the tool caddy 1 extends beyond the outermost edge of the trash barrel 14. One deficiency of a trash barrel is the tendency of its outermost edge to mark surfaces that they rub against as the service provider moves the trash barrel through the service area. The tool caddy 1 will prevent the outermost edge of the trash barrel 14 from contacting most surfaces thereby reducing the chance of marking such surfaces.

As shown in FIG. 3 of this embodiment, the exposed corners of the tool caddy [I] may be rounded. The outermost edges of the tool caddy may mark surfaces that it impacts or rubs against as the trash barrel, tool caddy, wheeled dolly combination shown in FIG. 5 is moved through the service area. Rounding the exposed outer corners of the tool caddy will lessen the tendency of the tool caddy to mark surfaces that it rubs against. The circular element is cylindrical in shape and the height of said cylindrical shape is between 4 inches and 8 inches.

The embodiment of the tool caddy 1 shown in FIG. 2 illustrates outwardly disposed compartments 8 and 12 oriented radially around the tool caddy's inner circular element 2, except where the outer stabilizing edge 10 is situated. The outwardly disposed compartments 8 and 12 may be strategically narrowed to decrease the overall width of the tool caddy 1, thereby increasing the maneuverability of the trash barrel, tool caddy, wheeled dolly combination as shown in FIG. 5.

I claim:

1. A trash barrel tool caddy, said trash barrel tool caddy comprising:
   a) a top surface section, said top surface section comprising a flat piece of rigid material, said top surface section further comprising:
      i) a circular opening in the center of said flat piece of said rigid material thereof, said diameter of said circular opening being slightly larger than the diameter of a trash barrel; and
      ii) a plurality of other smaller openings at least partially surrounding said circular opening in said top surface section said smaller openings of said top section are enclosed, such that said openings are compartmentalized;
   b) an outer perimeter wall, wherein a top of said outside wall is connected to said top surface section;
   c) an inner circular element, the top of said inner circular element is connected to the top of the opening of said top surface section, therein forming an annulus;
   wherein a garbage barrel fits into the annulus, and tools and other implements fit into the smaller openings, said smaller openings at least partially surrounding the opening to the annulus.

2. The trash barrel tool caddy according to claim 1, further comprising a lip positioned at the bottom and inside circumference of said inner circular element of said caddy, wherein said trash barrel rests on top of said lip.

3. The trash barrel tool caddy according to claim 2, wherein said top surface section, said annulus, said inner circular element, said outside wall, and said lip are integral.

4. The trash barrel tool caddy according to claim 2, wherein said lip is inwardly disposed to fit between the bottom of said trash barrel and a top of a separate wheeled base for a trash barrel.

5. The trash barrel tool caddy according to claim 1, wherein said edges of said outer walls and said top section of said trash barrel tool caddy and are rounded.

6. The trash barrel tool caddy according to claim 1, wherein at least part of said perimeter of said trash barrel tool caddy is circular.

7. The trash barrel tool caddy according to claim 1, wherein at least part of said perimeter of said trash barrel tool caddy is a flat surface.

8. The trash barrel tool caddy according to claim 7, wherein said flat surface is an outer stabilizing edge.

* * * * *